United States Patent
Kubota et al.

(10) Patent No.: US 8,035,780 B2
(45) Date of Patent: Oct. 11, 2011

(54) LIQUID CRYSTAL DISPLAY DEVICE

(75) Inventors: Hidenao Kubota, Mobara (JP);
Yoshiaki Nakamura, Mobara (JP);
Hiroaki Miwa, Yokohama (JP); Shinji Tanabe, Mobara (JP); Yoshiaki Sakurai, Kujukuri (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 13/103,386

(22) Filed: May 9, 2011

(65) Prior Publication Data
US 2011/0211136 A1 Sep. 1, 2011

Related U.S. Application Data

(62) Division of application No. 12/358,428, filed on Jan. 23, 2009.

(30) Foreign Application Priority Data

Jan. 25, 2008 (JP) .................................. 2008-015181

(51) Int. Cl.
*G02F 1/1335* (2006.01)
(52) U.S. Cl. ........... 349/110; 349/58; 349/122; 349/158
(58) Field of Classification Search .................. None
See application file for complete search history.

(56) References Cited

U.S. PATENT DOCUMENTS

| 6,654,083 B1 | 11/2003 | Toda et al. |
| 7,808,586 B2 * | 10/2010 | Mochizuki ............... 349/110 |
| 2007/0200969 A1 | 8/2007 | Hsu et al. |

FOREIGN PATENT DOCUMENTS

JP 11-174417 7/1999

* cited by examiner

*Primary Examiner* — Richard Kim
(74) *Attorney, Agent, or Firm* — Antonelli, Terry, Stout & Kraus, LLP.

(57) ABSTRACT

A liquid crystal display device which can prevent the generation of bubbles on an adhesive surface between a liquid crystal display panel and a face plate which protects the liquid crystal display panel is provided. In mounting the face plate on an upper polarizer of the liquid crystal display panel by way of an adhesive material, a picture frame is formed on a periphery of the face plate for enhancing design property. Although the picture frame is formed by printing black ink, a quantity of Si present in the black ink is set to not more than 0.7% and not less than 0.01% thus preventing the generation of bubbles attributed to defective adhesion between the face plate and the adhesive material.

5 Claims, 8 Drawing Sheets

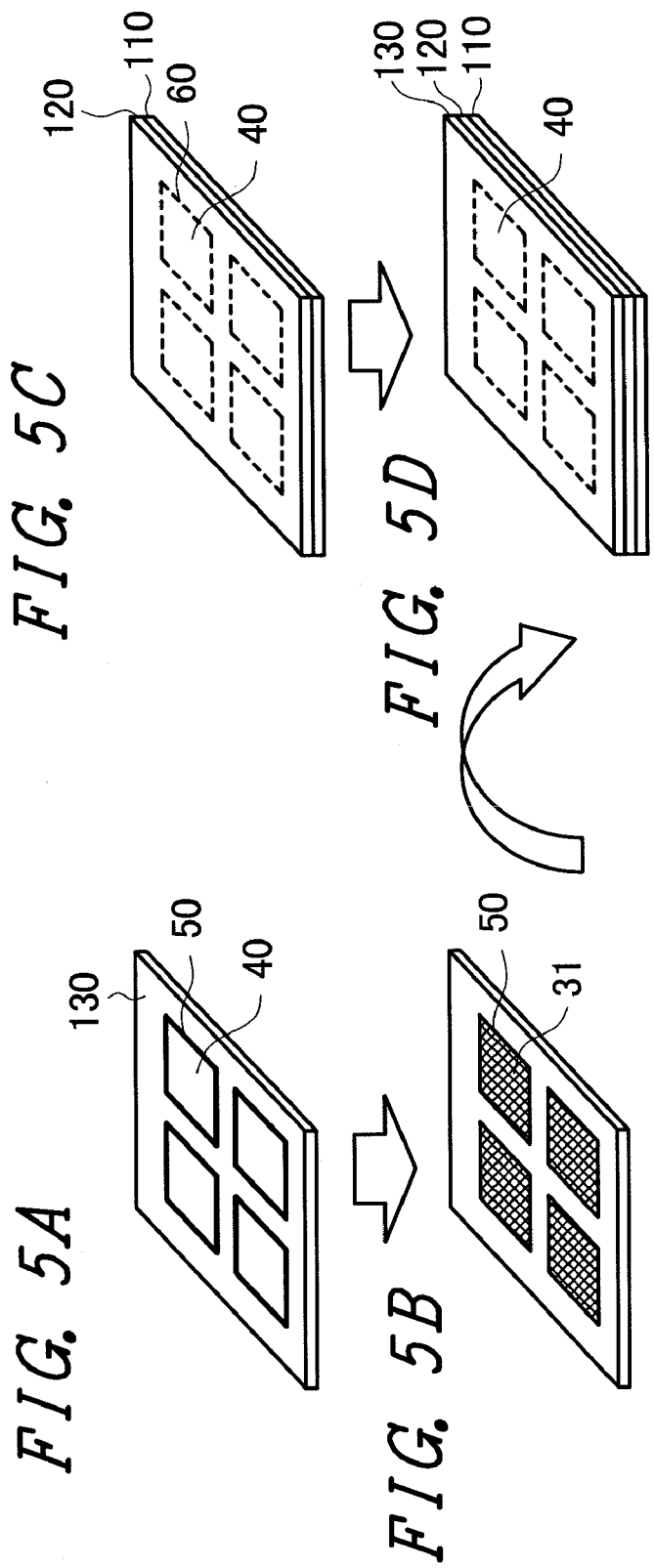

LIQUID CRYSTAL DISPLAY DEVICE

CROSS-REFERENCE TO RELATED APPLICATIONS

This application is a divisional application of U.S. Ser. No. 12/358,428, filed Jan. 23, 2009, the contents of which are incorporated herein by reference.

The disclosure of Japanese Patent Application No. 2008-15181 filed on Jan. 25, 2008 including the specification, drawings and abstract is incorporated herein by reference in its entirety.

BACKGROUND OF THE INVENTION

1. Field of the Invention

The present invention relates to a liquid crystal display device, and more particularly to a technique which can enhance a strength and visibility of a miniaturized display device used in a mobile phone or the like.

2. Description of Related Arts

With respect to a liquid crystal display device, there has been a strong demand for making a profile size of the display device smaller while maintaining a screen at a fixed size as well as a demand for the reduction of a thickness of a liquid crystal display panel. To achieve the reduction of thickness of the liquid crystal display panel, a thickness of the liquid crystal display panel is decreased by polishing an outer side of the liquid crystal display panel after manufacturing the liquid crystal display panel.

With respect to a glass substrate which is used for forming a TFT substrate which constitutes the liquid crystal display panel and forms pixel electrodes, TFTs (thin film transistors) and the like thereon and a counter substrate which constitutes the liquid crystal display panel and forms color filters thereon, a thickness of each substrate is standardized to 0.5 mm or 0.7 mm, for example. It is difficult to obtain such standardized glass substrate from a market. Further, such an extremely thin glass substrate causes drawbacks with respect to a mechanical strength, deflection and the like during a manufacturing process thus lowering a manufacturing yield rate. As a result, a liquid crystal display panel is formed using a standardized glass substrate and, thereafter, an outer surface of the liquid crystal display panel is polished to reduce the thickness of the liquid crystal display panel.

When the thickness of the liquid crystal display panel is reduced, there arises a drawback with respect to a mechanical strength of the liquid crystal display panel. That is, when a mechanical pressure is applied to a display screen of the liquid crystal display panel, there arises a possibility that the liquid crystal display panel is broken. To prevent such a drawback, as shown in FIG. 8, in incorporating the liquid crystal display panel in a mobile phone set or the like, a front window (hereinafter, referred to as a face plate) is mounted on a screen side of the liquid crystal display panel.

To prevent an external force applied to the face plate from being applied to the liquid crystal display panel, the face plate is arranged in a spaced-apart manner from the liquid crystal display panel. However, the constitution shown in FIG. 8 gives rise to a drawback that display quality is deteriorated as described later. Japanese patent Laid-Open Hei 11-174417 (patent document 1) discloses a technique which is provided for coping with the drawback attributed to the structure shown in FIG. 8, for example.

SUMMARY OF THE INVENTION

With respect to the related art shown in FIG. 8, there arises a drawback that an image appears double. FIG. 8 is a view showing a reflective liquid crystal display panel as an example of the liquid crystal display panel. In FIG. 8, the liquid crystal display panel is constituted of a TFT substrate 11 on which pixel electrodes, TFTs (thin film transistors) and the like are formed, and a counter substrate 12 on which color filters and the like are formed. In FIG. 8, external light L is incident, passes a face plate 30, is reflected on the liquid crystal display panel, passes the face plate 30 again, and enters an eye of a person. Here, although external light L is refracted on the face plate 30, such refraction is ignored in FIG. 8.

A portion of light which is reflected on a screen P1 of the liquid crystal display panel is reflected on a lower surface Q1 of the face plate 30, and is incident on and is reflected on a screen P2 of the liquid crystal display panel. When a person observes the light reflected on the screen P2, there arises a phenomenon that an image appears double. Although the explanation has been made by taking the reflective liquid crystal display panel shown in FIG. 8 as an example, the same goes for a transmissive liquid crystal display panel. That is, in the transmissive liquid crystal display panel, when light passes the liquid crystal display panel at the same angle as reflection light on the screen P1 of the liquid crystal display panel, the light is reflected on the lower surface Q1 of the face plate 30, and takes the same path in the same manner as in the case of the reflective liquid crystal display panel. Such a phenomenon which makes an image appear double deteriorates an image quality.

To cope with such a drawback, the technique disclosed in patent document 1, for example, arranges an adhesive elastic body between the face plate and the liquid crystal display panel. This adhesive elastic body is provided for protecting the liquid crystal display panel from an external force and, at the same time, for suppressing reflection of light on an interface of the face plate by setting a refractive index of the adhesive elastic body to a value close to a refractive index of the face plate. However, with respect to the technique disclosed in patent document 1, the uniform lamination of the face plate while eliminating the presence of bubbles or the like between the face plate and the elastic adhesive material is an extremely difficult technique from a viewpoint of mass production. Further, in addition to a drawback that the selection of a material which makes a refractive index of the elastic adhesive material approximate a refractive index of the face plate is difficult, the elastic adhesive material requires a considerable thickness and hence, the drawback that an image appears double cannot be overcome completely.

To satisfy a demand on design, it is often the case that a picture-frame-shaped light blocking film is formed on the face plate which is mounted on the liquid crystal display panel. The picture-frame-shaped light blocking film is formed such that black ink is applied to the face plate by printing, and printed black ink is dried and solidified by baking the face plate. An additive is used for preventing the occurrence of pin holes at the time of printing black ink or for leveling a printed surface due to a leveling effect. In adhering the face plate to the liquid crystal display panel by an adhesive material, this additive may adversely influence an adhesive strength of the additive.

The present invention has been made to overcome the above-mentioned drawbacks and it is an object of the present invention to provide a liquid crystal display device which can prevent the generation of bubbles attributed to an adhesive strength at the time of adhering a face plate to a liquid crystal display panel.

To explain the specific constitutions of the present invention, they are as follows.

(1) The present invention is directed to a liquid crystal display device which includes a liquid crystal display panel constituted of a TFT substrate on which pixel electrodes and TFTs which control signals to the pixel electrodes are arranged in a matrix array, and a counter substrate on which color filters corresponding to the pixel electrodes are formed, wherein an upper polarizer is adhered to the counter substrate, a face plate made of glass is adhered to the upper polarizer, the upper polarizer and the face plate are adhered to each other using an ultraviolet curing resin, a picture-frame-shaped light blocking film is formed on an inner side of the face plate, the light blocking film is formed by printing black ink, and the black ink contains not more than 0.7% and not less than 0.01% of Si.

(2) A liquid crystal display device having the constitution (1) is characterized in that the light blocking film contains not more than 0.5% and not less than 0.01% of Si.

(3) A liquid crystal display device having the constitution (1) is characterized in that the black ink contains carbon black.

(4) A liquid crystal display device having the constitution (1) is characterized in that the picture-frame-shaped light blocking film is formed by printing the black ink on the face plate and by drying the black ink under conditions of not more than 70° C. and not more than 30 minutes.

(5) A liquid crystal display device having the constitution (1) is characterized in that the picture-frame-shaped light blocking film is formed by printing the black ink on the face plate and by drying the black ink under conditions of not more than 60° C. and not more than 60 minutes.

(6) A liquid crystal display device having the constitution (1) is characterized in that the face plate is made of an acrylic resin.

(7) The present invention is also directed to a liquid crystal display device which includes a liquid crystal display panel constituted of a TFT substrate on which pixel electrodes and TFTs which control signals to the pixel electrodes are arranged in a matrix array, and a counter substrate on which color filters corresponding to the pixel electrodes are formed, wherein an upper polarizer is adhered to the counter substrate, a face plate made of glass is adhered to the upper polarizer, and the upper polarizer and the face plate are adhered to each other using an ultraviolet curing resin, and a picture-frame-shaped light blocking film is formed on an inner side of the face plate, the light blocking film is formed by printing black ink, and the black ink contains a carbon-hydride-based additive.

(8) A liquid crystal display device having the constitution (7) is characterized in that the black ink contains not more than 1.2% and not less than 0.1% of the carbon-hydride-based additive.

(9) A liquid crystal display device having the constitution (7) is characterized in that a Si content of the black ink is less than 0.01%.

(10) A liquid crystal display device having the constitution (7) is characterized in that the black ink contains carbon black.

(11) A liquid crystal display device having the constitution (7) is characterized in that the face plate is made of an acrylic resin.

According to the present invention, in the liquid crystal display device which forms the light blocking film on the periphery of the face plate, for enhancing design property, the light blocking film is formed by printing the black ink on the periphery of the face plate. Here, by setting a quantity of Si contained in the black ink to not more than 0.7% and not less than 0.01%, it is possible to prevent the generation of bubbles between the face plate and the liquid crystal display panel when the face plate is adhered to the liquid crystal display panel. At the same time, the occurrence of pin holes at the time of printing can be prevented, and a printed surface can be leveled due to a leveling effect.

Further, according to another aspect of the present invention, with the use of the carbon-hydride-based additive as the additive of the black ink to be printed on the periphery of the face plate, it is possible to prevent the generation of bubbles between the face plate and the liquid crystal display panel when the face plate is adhered to the liquid crystal display panel. At the same time, the occurrence of pin holes at the time of printing can be prevented, and a printed surface can be leveled due to a leveling effect.

BRIEF DESCRIPTION OF THE DRAWINGS

FIG. 5A to FIG. 5D is a schematic view showing essential manufacturing steps relating to the present invention;

DETAILED DESCRIPTION OF THE INVENTION

Embodiment 1

The detailed content of the present invention is explained in accordance with embodiments.

Figure 1:
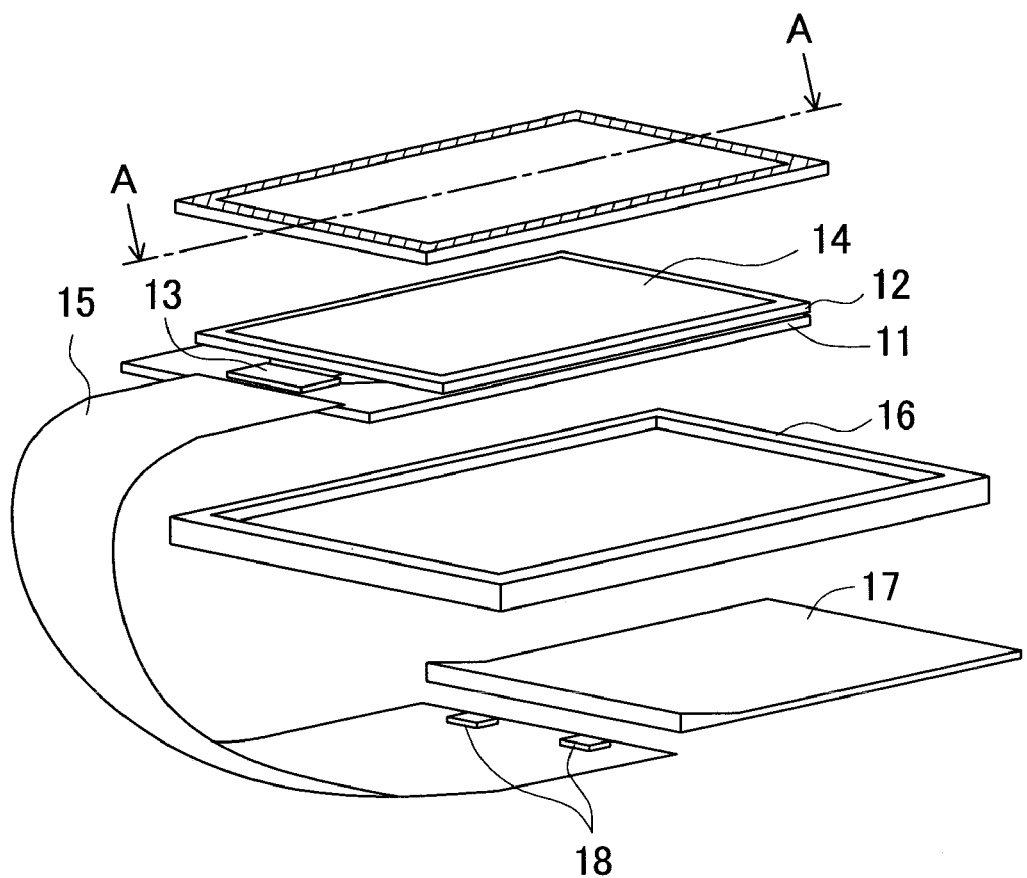
FIG. 1 is an exploded perspective view of a liquid crystal display device to which the present invention is applied.
Figure 2:
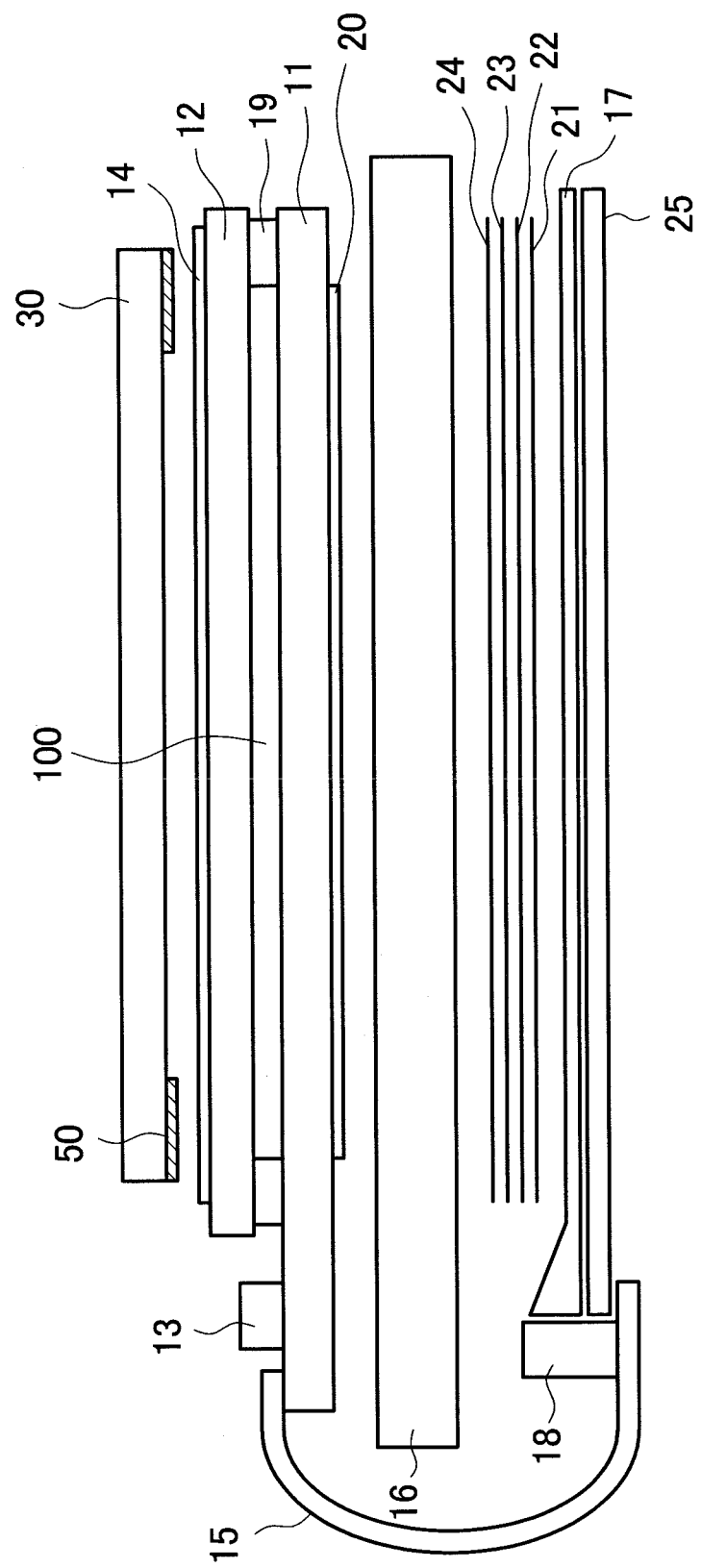
FIG. 2 is a cross-sectional view taken along a line A-A in FIG. 1.

FIG. 1 is an exploded perspective view showing an embodiment 1 of the present invention. FIG. 2 is an exploded cross-sectional view taken along a line A-A in FIG. 1. In FIG. 1, a liquid crystal display panel is constituted of a TFT substrate 11 and a counter substrate 12. Pixel electrodes are formed on the TFT substrate 11 in a matrix array, and each pixel electrode is provided with a TFT (Thin Film Transistor) for switching a signal. The counter substrate 12 on which color filters are formed is arranged to face the TFT substrate 11 in an opposed manner.

In manufacturing the TFT substrate 11 and the counter substrate 12 respectively, a glass substrate which is used for forming the TFT substrate 11 and the counter substrate 12 has a thickness of 0.5 mm. After completing a liquid crystal display panel by sealing liquid crystal in a space defined between the TFT substrate 11 and the counter substrate 12, an outer side of the liquid crystal display panel is polished so as to reduce a thickness of the whole liquid crystal display panel. In this embodiment, a thickness of the liquid crystal display panel after polishing is set to an approximately 0.6 mm. That is, the thicknesses of respective glass substrates are reduced by polishing by 0.2 mm.

The TFT substrate 11 is formed larger than the counter substrate 12, and a drive IC 13 and a flexible printed circuit board 15 are mounted on a portion of the TFT substrate 11 which is formed as a single plate. The liquid crystal display panel is housed in a resin mold 16 so that the liquid crystal display panel is mechanically protected. The liquid crystal display panel exhibits a high mechanical strength at a portion thereof where the TFT substrate 11 and the counter substrate 12 overlap with each other. However, the liquid crystal display panel exhibits a low mechanical strength at a portion thereof which is constituted of a single plate, that is, of only the TFT substrate 11. To prevent an impact from being applied to such a portion which exhibits a low mechanical strength, the liquid crystal display panel has the mold structure.

A backlight is arranged below the mold 16. In FIG. 1, only a light guide plate 17 of the backlight is shown. That is, although various optical sheets are arranged between the liquid crystal display panel and the light guide plate 17, these optical sheets are omitted from FIG. 1. The flexible printed circuit board 15 is routed to a back side of the mold 16 and is arranged below the backlight. On the flexible printed circuit board 15, an LED 18 (Light Emitting Diode) which constitutes a light source of the backlight is mounted. The LED 18 is arranged on a side surface of the light guide plate 17. On the flexible printed circuit board 15, not only the LED 18 and a power source of the LED 18 but also a power source for driving the liquid crystal display panel and lines which form scanning lines and data signal lines and the like are arranged.

In FIG. 1, an upper polarizer 14 is mounted on an upper surface of the liquid crystal display panel. A face plate 30 is mounted on the upper polarizer 14. The face plate 30 is made of an acrylic resin, and a thickness of the face plate 30 is set to 1.8 mm. The thickness of the face plate 30 is set larger than a thickness of the liquid crystal display panel and cracks hardly occur in the acrylic resin and hence, the face plate 30 possesses a sufficient mechanical strength for protecting the liquid crystal display panel. The face plate 30 is adhered to the liquid crystal display panel, to be more specific, to the upper polarizer 14 using an acrylic adhesive material 31.

As other material which can be used for forming the face plate 30, poly-carbonate, glass or the like is named. In using glass as a material of the face plate 30, it is preferable to use reinforced glass. Further, it is necessary to properly chamfer glass-made face plate 30 for preventing the occurrence of cracks in the face plate 30.

As shown in FIG. 1, a black picture frame 50 is formed on a periphery of the face plate 30. The black picture frame 50 is provided for enhancing design property of the liquid crystal display device. The picture frame 50 is formed by printing a black light blocking material on the face plate 30. For example, when Si or the like leaks from the light blocking material used for forming the picture frame 50, there exists a possibility that leaked Si may adversely influence adhesiveness between the adhesive material 31 and the face plate 30 so that bubbles may be generated in the adhesive material 31. The present invention is substantially characterized by the constitution which can prevent the generation of bubbles between the face plate 30 and the liquid crystal display panel by suppressing leaking of Si from the picture frame 50.

FIG. 2 is an exploded cross-sectional view taken along a line A-A in FIG. 1. In an actual constitution, the liquid crystal display panel and the backlight are housed in the mold 16. The face plate 30 is adhered to the liquid crystal display panel. In FIG. 2, a gap of few microns is present between the TFT substrate 11 and the counter substrate 12, and liquid crystal 100 is sandwiched between the TFT substrate 11 and the counter substrate 12. A sealing material 19 is formed on peripheries of the TFT substrate 11 and the counter substrate 12 so as to seal the liquid crystal 100 in a space defined by the TFT substrate 11, the counter substrate 12 and the sealing material 19.

On the TFT substrate 11, in addition to the pixel electrodes and the TFTs, scanning lines, data signal lines and the like are arranged. These lines extend to the outside while penetrating the sealing material 19 and are connected to the drive IC 13 or the flexible printed circuit board 15. The flexible printed circuit board 15 extends to a back side of the backlight. The LED 18 mounted on the flexible printed circuit board 15 is arranged on a side surface of the light guide plate 17 and constitutes a light source of the backlight. A plurality of LEDs 18 is arranged in the direction perpendicular to a paper plane of FIG. 2.

In FIG. 2, the light guide plate 17 plays a role of directing light which is emitted from the LEDs 18 arranged on a side surface of the light guide plate 17 in the direction toward the liquid crystal display panel side. A reflection sheet 25 directs light which is directed downwardly from the light guide plate 17 in the direction toward the liquid crystal display panel side. A lower diffusion sheet 21 is mounted on the light guide plate 17. Although the plurality of LEDs 18 is mounted on the side surface of the light guide plate 17, the LEDs 18 are arranged at intervals and hence, light which is directed upwardly from the light guide plate 17 becomes non-uniform. That is, areas surrounding positions where the LEDs 18 are arranged exhibit more brightness. The lower diffusion sheet 21 plays a role of making light which is directed in the upward direction from the light guide plate 17 uniform.

A lower prism sheet 22 is mounted on the lower diffusion sheet 21. A large number of prisms which extend in the lateral direction of the screen are mounted on the lower prism sheet 22 at fixed intervals, for example, at intervals of approximately 50 μm. Out of the light which is radiated from the light guide plate 17, the prisms converge light which is liable to spread in the longitudinal direction of the screen in the longitudinal direction of the screen of the liquid crystal display panel. An upper prism sheet 23 is mounted on the lower prism sheet 22. On the upper prism sheet 23, a large number of prisms which extend in the direction orthogonal to the lower prism sheet 22, for example, in the longitudinal direction of the screen are formed at fixed intervals, that is, at intervals of approximately 50 μm. Due to such constitution, out of the light which is radiated from the light guide plate 17, the prisms converge light which is liable to spread in the lateral direction of the screen in the direction normal to a surface of the liquid crystal display panel. As described above, with the use of the lower prism sheet 22 and the upper prism sheet 23, light which is liable to spread in the longitudinal and lateral directions of the screen can be converged in the normal direction of the screen. That is, with the use of the lower prism sheet 22 and the upper prism sheet 23, front-face brightness of the screen can be increased.

An upper diffusion sheet 24 is mounted on the upper prism sheet 23. A plurality of prisms which extends in the predetermined direction is formed on the prism sheet at intervals of 50 μm, for example. That is, bright and dark stripes are formed at intervals of 50 μm. On the other hand, on the liquid crystal display panel, the scanning lines are formed in the lateral direction of the screen at fixed intervals, and the data signal lines are formed in the longitudinal direction of the screen at fixed intervals. Accordingly, interference is generated between the scanning lines and the lower prism sheet 22 or between the data signal lines and the upper prism sheet 23 thus generating moiré fringes. The upper diffusion sheet 24 plays a role of reducing the moiré fringes by a diffusion action.

Light radiated from the upper diffusion sheet 24 is incident on the lower polarizer 20 which is adhered to the liquid crystal display panel and is polarized. The polarized light has transmissivity thereof controlled by liquid crystal in the inside of the liquid crystal display panel for every pixel thus forming an image. The light which is radiated from the liquid crystal display panel is polarized again by the upper polarizer 14, and is visually recognized by eyes of a person. The face plate 30 is mounted on the upper polarizer 14. The face plate 30 of the present invention is made of an acrylic resin. The face plate 30 is adhered to the upper polarizer 14 using the adhesive material 31.

Figure 3A:
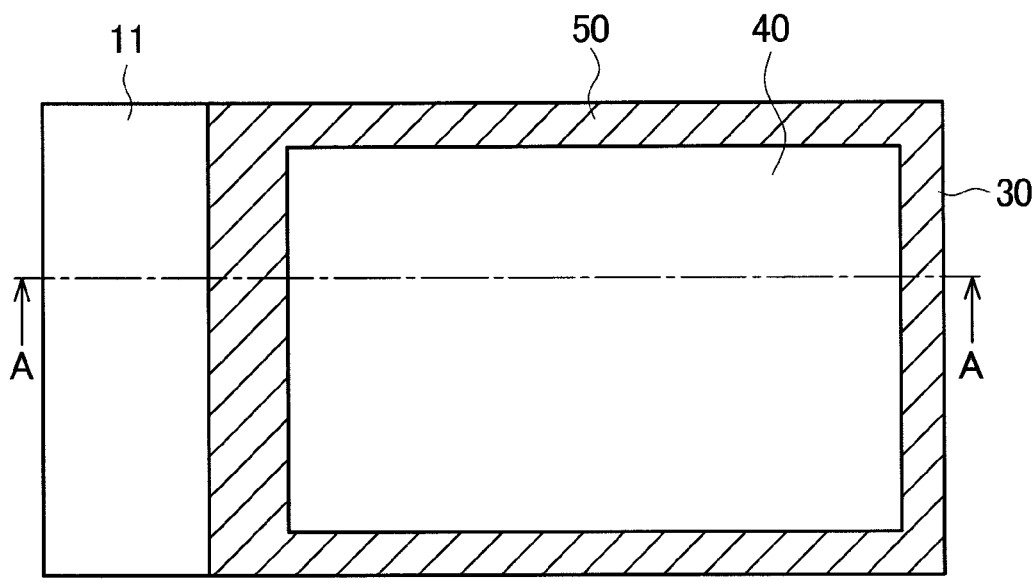
FIG. 3A and FIG. 3B are views showing a state in which a face plate is mounted on the liquid crystal display panel.
Figure 3B:
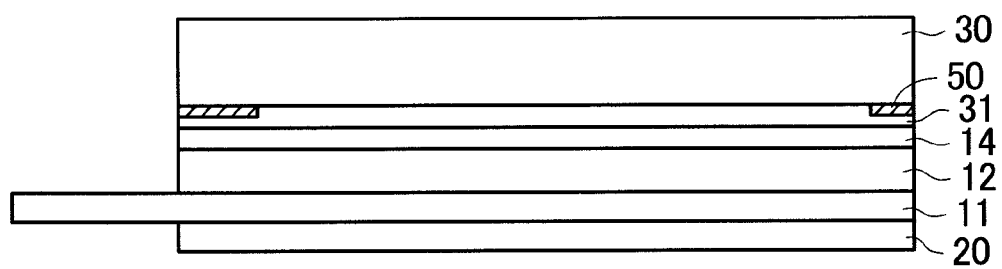

FIG. 3A and FIG. 3B show a state after the face plate 30 is adhered to the upper polarizer 14. FIG. 3A and FIG. 3B show only the liquid crystal display panel and the face plate 30. FIG. 3A is a plan view, and FIG. 3B is a cross-sectional view taken along a line A-A in FIG. 3A. In FIG. 3A, a black picture frame 50 is formed on the periphery of the face plate 30. A display region 40 is formed inside the picture frame 50. The picture frame 50 is provided for enhancing design property of the liquid crystal display panel. In FIG. 3A, a terminal portion 111 of the TFT substrate 11 is arranged on a left side. Although terminals for supplying power source and signals to the liquid crystal display panel, the drive IC for driving the liquid crystal display panel and the like are mounted on the terminal portion 111, these parts are omitted from FIG. 3.

In FIG. 3B, the lower polarizer 20 is adhered to a lower side of the TFT substrate 11, and the upper polarizer 14 is adhered to an upper side of the counter substrate 12. The face plate 30 is mounted on the upper polarizer 14 by way of the adhesive material 31. A plate thickness of the upper polarizer 14 or the lower polarizer 20 is set to 0.13 mm, and a thickness of the face plate 30 is set to 1.8 mm. Compared to a fact that a total thickness of the liquid crystal display panel which is formed by combining the TFT substrate 11 and the counter substrate 12 is set to 0.6 mm, the face plate 30 has a thickness considerably larger than the total thickness of the liquid crystal display panel. Further, cracks hardly occur in the acrylic resin compared to glass and hence, the face plate 30 can acquire a mechanical strength considerably larger than a mechanical strength of the liquid crystal display panel thus exhibiting a sufficient mechanical protection effect.

In this embodiment, a size of the face plate 30 is set substantially equal to a size of the counter substrate 12. The size of the face plate 30 is not limited to the above-mentioned size, and may be set larger or smaller than the size of the counter substrate 12 by taking easiness of adhesion between the face plate 30 and the liquid crystal display panel into consideration.

The picture frame 50 formed on the periphery of the face plate 30 is preliminarily applied to the face plate 30 by printing and is solidified by drying and, thereafter, the face plate 30 and the liquid crystal display panel are adhered to each other using the adhesive material 31. As the adhesive material 31 used for adhering the face plate 30, an ultraviolet curing resin which is in a liquid form originally is used. By adopting the ultraviolet curing resin which is in a liquid form originally as the adhesive material 31, the face plate 30 can be uniformly adhered to the liquid crystal display panel. That is, after applying the adhesive material 31, the liquid crystal display panel and the face plate 30 are adhered to each other under a reduced-pressure atmosphere. By adhering the liquid crystal display panel and the face plate 30 under a reduced-pressure atmosphere, it is possible to prevent the generation of bubbles 32.

After performing such an adhesion, by radiating ultraviolet rays (UV) to the adhesive material 31 which is in a liquid form originally, the adhesive material 31 is cured thus fixing the face plate 30 to the liquid crystal display panel. Due to such processing, the face plate 30 can be uniformly adhered to the liquid crystal display panel. As the adhesive material 31 which is in a liquid form originally, an acrylic resin which contains 27% to 30% of acrylic oligomer, UV-reactive monomer, an additive for the photo-polymerization and the like may be used. A thickness of a cured adhesive material 31 is set to approximately 50 μm.

The light blocking film which constitutes the picture frame 50 is formed by applying black ink to an inner side of the face plate 30 by printing. The black ink is, for example, constituted of following components. That is, the black ink contains 26% to 38% of a mixed resin made of poly-vinyl chloride acetate copolymer and a urethane resin, 3% to 7% of pigment (carbon black), other solvents and the like.

In printing the black ink to the face plate 30, there may be a case that pin holes are formed in the light blocking film. Further, although some irregularities may occur on a printed surface after applying the black ink to the face plate 30 by printing, the irregularities are leveled due to the flow of the printed surface. This phenomenon is referred to as a leveling effect. The addition of Si to the black ink is effective in preventing the occurrence of the pin holes in the printed surface and in enhancing the leveling effect of the printed surface.

After applying the black ink to the face plate 30, the black ink is fixed to the face plate 30 by drying the face plate 30. When an addition quantity of Si is large, Si is diffused into the outside of the light blocking film, for example, the periphery of the display region 40. When a large quantity of Si is present between the face plate 30 and the adhesive material 31, an adhesive strength between the face plate 30 and the adhesive material 31 becomes weak and hence, the bubbles 32 are generated.

Figure 4A:
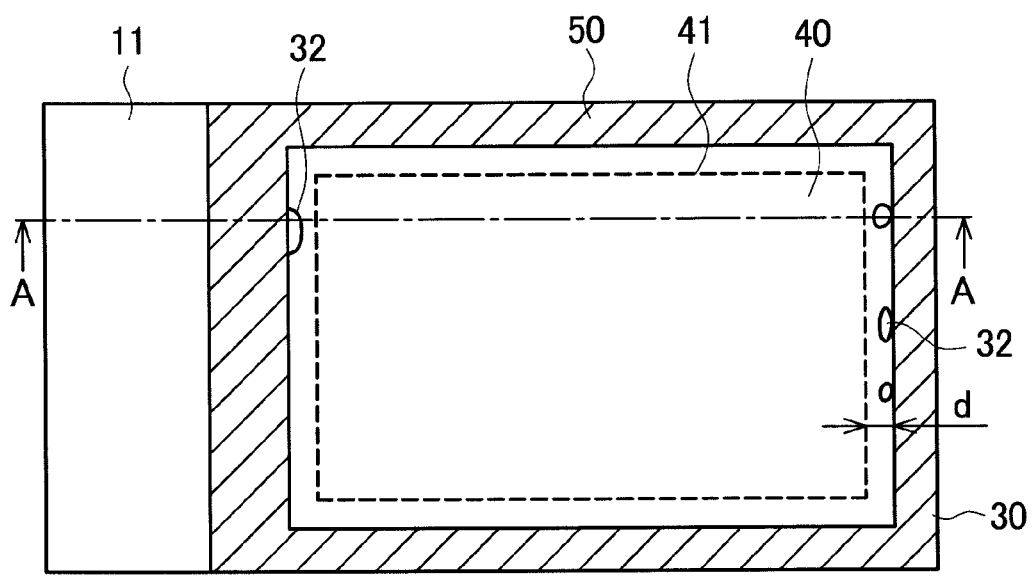
FIG. 4A and FIG. 4B are views showing a state in which bubbles are generated between the face plate and the liquid crystal display panel.
Figure 4B:
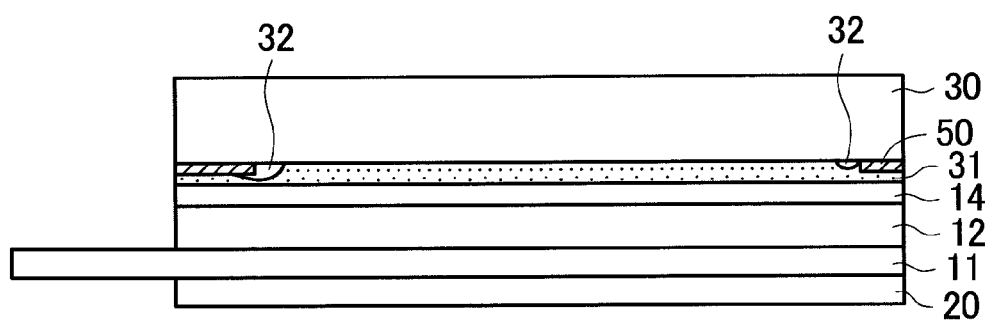

FIG. 4A and FIG. 4B show a mechanism how the bubbles 32 are generated. FIG. 4A is a plan view, and FIG. 4B is a cross-sectional view taken along a line A-A in FIG. 4A. In FIG. 4A, a dotted line drawn in the display region 40 indicates a region having a possibility that Si leaking from the light blocking film which constitutes the picture frame 50 is present. This region falls within a range which is inwardly away from an inner side of the picture frame 50 by "d", and a width of "d" is 2 mm. This region constitutes an Si-diffusion area 41. A large quantity of bubbles 32 is generated in the Si-diffusion area 41.

FIG. 4B is a cross-sectional view taken along a line A-A in FIG. 4A. The constitution shown in FIG. 4B is substantially equal to the constitution shown in FIG. 3B except for that the bubbles 32 are shown in FIG. 4B. FIG. 4B shows that the bubbles 32 are generated inside the picture frame 50 and between the face plate 30 and the adhesive material 31. Although the bubbles 32 are also generated below the picture frame 50, the bubbles 32 generated below the picture frame 50 are covered with the black picture frame 50 and hence, such bubbles 32 are not visually recognized whereby there is no possibility that such bubbles 32 become a defect of the display device. Accordingly, the elimination of the bubbles 32 generated in the periphery of the display region 40 is important.

When an element of a portion where the bubbles 32 are present is identified, a large quantity of Si is detected. Si deteriorates an adhesive strength between the adhesive material 31 and the face plate 30 and generates the bubbles 32. However, the addition of Si into the black ink for forming the picture frame 50 is necessary for enhancing the reduction of pin holes and a leveling effect.

The presence of Si in the display region 40 is attributed to the dispersion of Si in the display region 40 when black ink is printed and solidified by drying. Further, provability of the generation of the bubbles 32 differs depending on a quantity of Si present in black ink. That is, when a quantity of Si is equal to or below a fixed value, the generation of the bubbles 32 can be suppressed. A quantity of Si in the display region 40 can be controlled by a quantity of Si added to black ink.

Accordingly, an addition quantity of Si in black ink is determined by taking the occurrence of pin holes during printing, the leveling effect and a rate of generation of the bubbles 32 after the face plate 30 is adhered to the liquid crystal display panel into consideration. According to an experiment, when the above-mentioned black ink is used, by setting a quantity of Si contained in black ink to not more than 0.7% and not less than 0.01% of a content of the light blocking film which constitutes the picture frame 50, it is possible to suppress the generation of the bubbles 32 while ensuring the prevention of the occurrence of pin holes and the leveling effect. That is, by suppressing a quantity of Si to a value which falls within such a range, a defect attributed to the occurrence of pin holes and a defect relating to the leveling effect can be suppressed to 0.1% or less. Further, the generation of the bubbles 32 can be also suppressed to 1% or less.

Further, by setting a quantity of Si to not more than 0.5% of the content of the light blocking film which constitutes the picture frame 50, the generation of the bubbles 32 can be further suppressed thus reducing a rate of generation of a defect attributed to the bubbles 32 to 0.5% or less. The generation of the bubbles 32 described above can be also changed depending on a drying condition of black ink after black ink is applied to the face plate 30 by coating. That is, the higher a drying temperature or the longer a drying time, the larger a chance that Si is diffused to the outside of the picture frame 50 becomes. The above-mentioned results are values which are acquired when the face plate 30 is dried at a temperature of 70° C. for 60 minutes after applying black ink to the face plate 30 by coating. Accordingly, the generation of the bubbles 32 can be further reduced by lowering the drying temperature or shortening the drying time.

FIG. 5 is a schematic view showing steps of forming a hybrid liquid crystal display panel which is formed by combining the liquid crystal display panel and the face plate 30 shown in FIG. 3. In FIG. 5, FIGS. 5(a) and (b) show steps of forming the face plate 30, FIG. 5(c) shows a step of forming the liquid crystal display panel, and FIG. 5(d) shows a state in which the liquid crystal display panel and the face plate 30 are laminated to each other. As shown in FIG. 5, a plurality of face plates 30 is formed in a mother face plate 130. Further, the liquid crystal display panel is also the combination of a mother TFT substrate 110 in which a plurality of TFT substrates 11 are formed and a mother counter substrate 120 in which a plurality of counter substrates 12 are formed. FIG. 5 shows an example in which four face plates 30 or four liquid crystal display panels are formed from the mother substrate.

In FIG. 5(a), black ink is formed on the mother face plate 130 by printing for forming the picture frame 50. Printing conditions and a material of black ink are determined such that pin holes do not occur in the printed black ink or a printed surface becomes flat due to a leveling effect. After printing, black ink is solidified by drying the mother face plate 130 under specific conditions.

Thereafter, as shown in FIG. 5(b), a UV curing resin is applied to the display region 40 of the face plate 30 and the picture frame 50 by printing. The UV curing resin is in a liquid form at the time of printing. As a material of the UV curing resin, the material which is explained previously can be used.

On the other hand, as shown in FIG. 5(c), the liquid crystal display panel is formed separately from the face plate 30. That is, the TFT substrates 11 amounting to four pieces of liquid crystal display panels are formed in the mother TFT substrate 110. Further, the counter substrates 12 amounting to four liquid crystal display panels are formed in the mother counter substrate 120. In FIG. 5(c), portions indicated by a dotted line are sealing portions 60 for sealing the TFT substrates 11 and the counter substrates 12. Liquid crystal is sealed inside each sealing portion 60. Liquid crystal may be filled by either a dropping method or a suction method. In this manner, four pieces of liquid crystal display panels are formed in the mother substrate.

The mother face plate 130 formed as shown in FIG. 5(b) is inverted, and is adhered to the mother counter substrate 120 of the mother liquid crystal display panel formed as shown in FIG. 5(c). This adhesion is performed by a UV adhesive material 31 formed on the mother face plate 130. This adhering step is performed in a pressure-reduced atmosphere for preventing entanglement of air into the adhering portion. Thereafter, ultraviolet rays are radiated to a portion of the UV adhesive material 31 for temporarily fixing the mother face plate 130 to the mother counter substrate 120, and the inspection of bubbles 32 or the like is performed.

Figure 6:
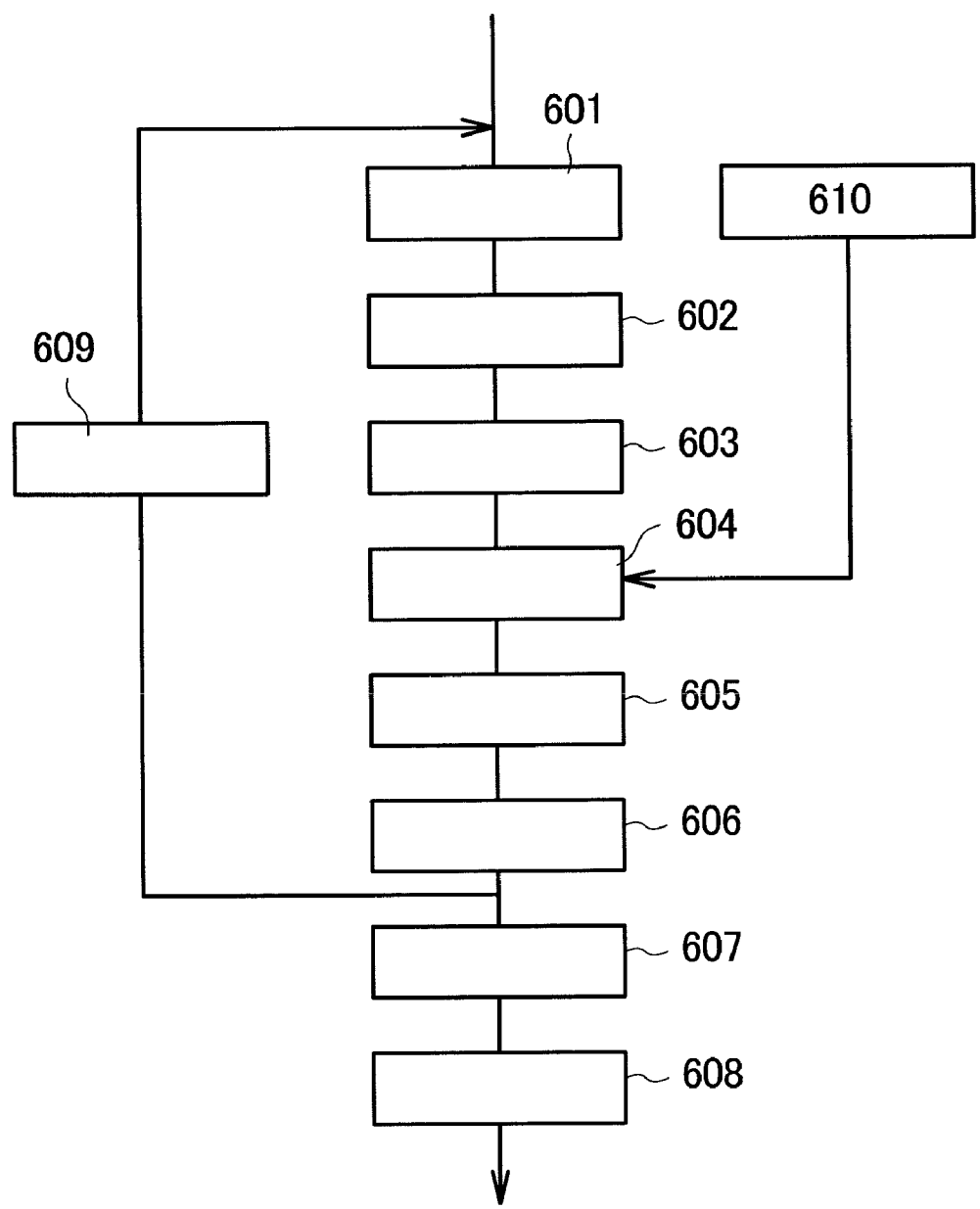
FIG. 6 is a flowchart of the manufacturing steps relating to the present invention.

FIG. 6 is a flowchart showing a process flow consisting of steps of forming a hybrid liquid crystal display panel which is formed by combining the liquid crystal display panel and the face plate 30 shown in FIG. 3. Hereinafter, the combination of the liquid crystal display panel and the face plate 30 is referred to as the hybrid liquid crystal display panel. The steps of this process flow are applied, as shown in FIG. 5, to the mother liquid crystal display panel or the mother face plate 130. Then, after finishing steps shown in FIG. 6, the individual hybrid liquid crystal display panels are separated from the mother substrate. Hereinafter, in the explanation of the process flow shown in FIG. 6, there may be a case that the face plate 30 and the liquid crystal display panel refer to the mother face plate 130 and the mother liquid crystal display panel.

In FIG. 6, the center flow is the process flow of the face plate 30. FIG. 6, step 601 implies a DUV (Deep UV) step in which deep ultraviolet rays are radiated to the face plate 30. By radiating deep ultraviolet rays to the face plate 30, dusts or the like adhered to the face plate 30 can be easily removed. After cleaning the face plate 30 in the DUV step, first of all, black ink which becomes the picture frame 50 of the face plate 30 is applied by printing (step 602: light blocking portion printing step). In this light blocking printing step, a material of black ink or printing conditions are determined such that pin holes do not occur or a printed surface becomes flat due to a leveling effect.

The face plate 30 on which the picture frame 50 is printed using black ink is baked for drying. At the time of performing such baking, there may arise a drawback that Si added to black ink precipitates from the printed picture frame 50 and is diffused in the display region 40 arranged inside the picture frame 50. When a diffusion quantity of Si is large, Si adversely influences the adhesion between the adhesive material 31 and the face plate 30.

Figure 7:
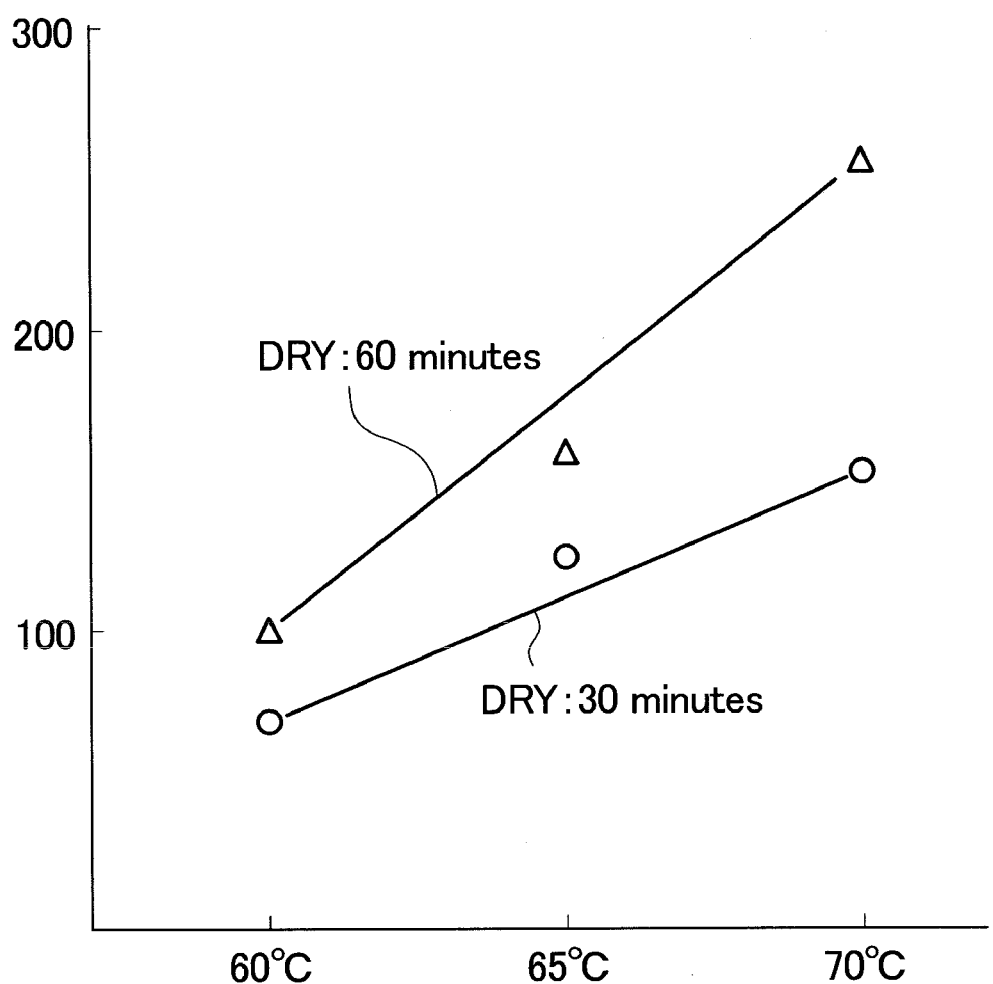
FIG. 7 is a graph showing the relationship between a drying condition of the face plate and a quantity of Si in ink on the face plate.
Figure 8:
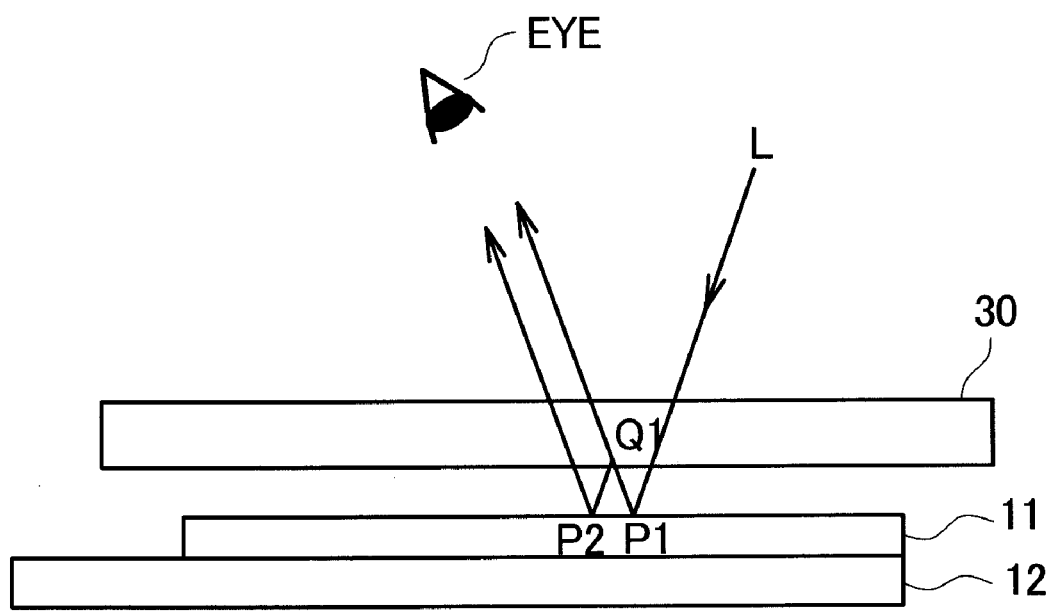
FIG. 8 is a view showing the relationship between a face plate and a liquid crystal display panel of a related art.

FIG. 7 is a graph which compares a quantity of Si present in the Si diffusion region 41 of the face plate 30 which is changed depending on drying conditions of the face plate 30. In FIG. 7, a drying temperature (° C.) at which the face plate 30 is dried after printing black ink on the face plate 30 is taken on an axis of abscissas. The count number of Si (K amu.bin) counted by a mass spectrometric analysis in the Si diffusion region 41 shown in FIG. 4 is taken on an axis of ordinates. The evaluation in FIG. 7 is made with respect to a case in which drying time is set to 30 minutes and a case in which drying time is set to 60 minutes.

In FIG. 7, the higher the drying temperature, the larger the count number of Si in the Si diffusion region 41 becomes. Further, when the drying temperatures are the same in both cases, the longer the drying time, the larger the count number of Si becomes. That is, when the printed black ink is dried and solidified, Si added to black ink is precipitated and separated from black ink, and in this precipitation and separation of Si, the higher the drying temperature or the longer the drying time, a precipitation or separation quantity of Si is increased. Further, the higher the drying temperature or the longer the drying time, a speed at which precipitated or separated Si moves on the face plate 30 or a moving amount of such Si is also increased.

Si is added to black ink for ensuring the prevention of occurrence of pin holes and a leveling effect at the time of printing. When it is necessary to ensure a fixed amount of Si to be added to black ink in view of the relationship between pin holes and leveling at the time of printing, it is necessary to shorten the drying time or lower the drying temperature after printing. FIG. 7 is the graph which shows the relationship among the drying temperature, the drying time and the count quantity of Si in the Si diffusion region 41 shown in FIG. 4 when the quantity of Si in the light blocking film for forming the picture frame 50 after drying and solidifying is 0.7%.

In FIG. 7, under the condition that the drying temperature is set to 70° C., when the drying time is 30 minutes, Si count quantity becomes 150K amu.bin. In this case, the occurrence ratio of bubbles 32 corresponding to the Si count quantity is suppressed to 1% or less. On the other hand, under the condition that the drying temperature is set to 60° C., even when the drying time is set to 60 minutes, the Si count quantity is 100 K amu.bin. In this case, the occurrence ratio of bubbles 32 corresponding to the Si count quantity also can be suppressed to 1% or less. Further, by setting the drying temperature to 60° C. and the drying time to 30 minutes, possibility of generation of bubbles 32 can be further reduced. On the other hand, even when the Si quantity is decreased, provided that the occurrence of pin holes can be suppressed or the leveling effect can be ensured, it is possible to elevate the drying temperature of the face plate 30 or extend the drying time.

Returning to FIG. 6, black ink is printed on the face plate 30, and the picture frame 50 is formed by drying black ink. Thereafter, the adhesive material 31 for adhering the face plate 30 and the liquid crystal display panel is applied by printing (step 603). The adhesive material 31 is made of a UV curing resin. The adhesive material 31 is printed such that the adhesive material 31 covers the display region 40 of the face plate 30 and the picture frame 50.

The lamination of the liquid crystal display panel and the face plate 30 is performed under a reduced-pressure atmosphere such that the liquid crystal display panel 610 and the face plate 30 are adhered to each other by pushing (step 604). Since the adhesion is performed in the reduced-pressure atmosphere, there is no possibility that air is entangled between the face plate 30 and the liquid crystal display panel thus preventing the generation of bubbles 32 attributed to the entanglement of air. However, when Si is present in the face plate 30, the adhesion between the face plate 30 and the adhesive material 31 is prevented, and there may be a case that air intrudes into such a portion thus generating bubbles 32.

Accordingly, it is necessary to remove a possibility that Si is present in the face plate 30 by taking the above-mentioned means.

After adhering the face plat 30 and the liquid crystal display panel to each other, ultraviolet rays are radiated to a portion of the adhesive material 31, to be more specific, only corner portions of the face plate 30 thus temporarily fixing the face plate 30 and the liquid crystal display panel to each other (step 605). In a temporarily fixed state, the inspection of a hybrid liquid crystal display panel which is formed by adhering the face plate 30 and the liquid crystal display panel is performed (step 606). Inspection items are defects of the display region 40 and the like. At the time of performing such inspection, the presence or the non-presence of the bubbles 32 in the display region 40 is also inspected.

When the hybrid liquid crystal display panel passes this inspection, ultraviolet rays are radiated to the whole liquid crystal display panel thus completely adhering the face plate 30 and the liquid crystal display panel to each other (step 607). Ultraviolet rays are radiated from a face plate 30 side. In this case, the picture frame 50 is formed in the periphery of the face plate 30 and hence, ultraviolet rays do not pass below the picture frame 50 whereby the adhesive material 31 below the picture frame 50 is not solidified. To solidify the adhesive material 31 below the picture frame 50 also, after radiating ultraviolet rays to the whole surface of the liquid crystal display panel, the hybrid liquid crystal display panel is heated thus also solidifying the adhesive material 31 below the picture frame 50 of the face plate 30 thus enhancing reliability of adhesion (step 608).

In FIG. 6, when a defect occurs in the hybrid liquid crystal display panel in the inspection step, the hybrid liquid crystal display panel is transferred to a reproduction step (step 609). In the reproduction step, the face plate 30 and the liquid crystal display panel are separated from each other. The reason that ultraviolet rays are radiated only to the portion of the adhesive material 31 so as to temporarily fix the face plate 30 and the liquid crystal display panel to each other before the inspection is that the liquid crystal display panel and the face plate 30 can be separated easily in the reproduction step. After the face plate 30 and the liquid crystal display panel are separated from each other, the face plate 30 and the liquid crystal display panel are individually cleaned and are reproduced.

As described above, according to this embodiment, by defining the quantity of Si in the light blocking film which constitutes the picture frame 50 within the specified range, it is possible to prevent the generation of bubbles 32 attributed to lowering of the adhesive strength between the face plate 30 and the adhesive material 31 when the face plate 30 and the liquid crystal display panel are adhered to each other. Further, this embodiment can prevent the occurrence of pin holes when black ink is printed, and can make the printed surface flat by ensuring the leveling effect at the time of printing.

Embodiment 2

The picture frame 50 of the face plate 30 in the embodiment 1 is formed by printing black ink to which Si is added. Si is used for preventing the occurrence of pin holes and for making the printed surface flat by leveling at the time of printing black ink. On the other hand, with the use of Si, an adhesive strength of the adhesive material 31 becomes unstable in the periphery of the display region 40 of the face plate 30, and this unstable adhesive strength becomes a cause of the generation of bubbles 32.

In this embodiment, a carbon-hydride-based additive is used as the additive in place of Si. With the use of the carbon-hydride-based additive, at the time of printing black ink on the face plate 30, it is possible to acquire both of the prevention of occurrence of pin holes and the leveling effect. A material of black ink used in this embodiment is substantially equal to the material of black ink explained in conjunction with the embodiment 1. That is, the black ink contains 26% to 38% of a mixed resin made of poly-vinyl chloride acetate copolymer and a urethane resin, 3% to 7% of pigment (carbon black), other solvents and the like. By adding 0.1% to 1.2% of carbon-hydride-based additive to such black ink, it is possible to prevent the occurrence of pin holes at the time of printing black ink and to acquire the leveling effect of the printed surface.

Such black ink is applied to the face plate 30 by printing, and the picture frame 50 is formed by drying the face plate 30. Thereafter, the adhesive material 31 is formed by printing in the same manner as the embodiment 1. Then, the face plate 30 and the liquid crystal display panel are adhered to each other so as to form a hybrid liquid crystal display panel. In this embodiment, a quantity of Si in black ink is less than 0.01%. Since Si is not substantially present in black ink and hence, there arises no drawback with respect to the adhesion between the face plate 30 and the adhesive material 31. That is, in the region where a large quantity of bubbles 32 is generated in FIG. 4, similar bubbles 32 are not observed.

In this manner, with the use of black ink of this embodiment, it is possible to substantially eliminate the generation of the bubbles 32 attributed to defective adhesion between the adhesive material 31 and the face plate 30 in printing black ink. Further, this embodiment can prevent the occurrence of pin holes at the time of printing black ink and, at the same time, can make the printed surface flat by ensuring the proper leveling effect.

What is claimed is:

1. A liquid crystal display device which includes a liquid crystal display panel constituted of a TFT substrate on which pixel electrodes and TFTs which control signals to the pixel electrodes are arranged in a matrix array, and a counter substrate on which color filters corresponding to the pixel electrodes are formed, wherein an upper polarizer is adhered to the counter substrate, a face plate made of glass is adhered to the upper polarizer, and the upper polarizer and the face plate are adhered to each other using an ultraviolet curing resin, and a picture-frame-shaped light blocking film is formed on an inner side of the face plate, the light blocking film is formed by printing black ink, and the black ink contains a carbon-hydride-based additive.

2. A liquid crystal display device according to claim 1, wherein the black ink contains not more than 1.2% and not less than 0.1% of the carbon-hydride-based additive.

3. A liquid crystal display device according to claim 1, wherein a Si content of the black ink is less than 0.01%.

4. A liquid crystal display device according to claim 1, wherein the black ink contains carbon black.

5. A liquid crystal display device according to claim 1, wherein the face plate is made of an acrylic resin.

* * * * *